Figures 1, 2:
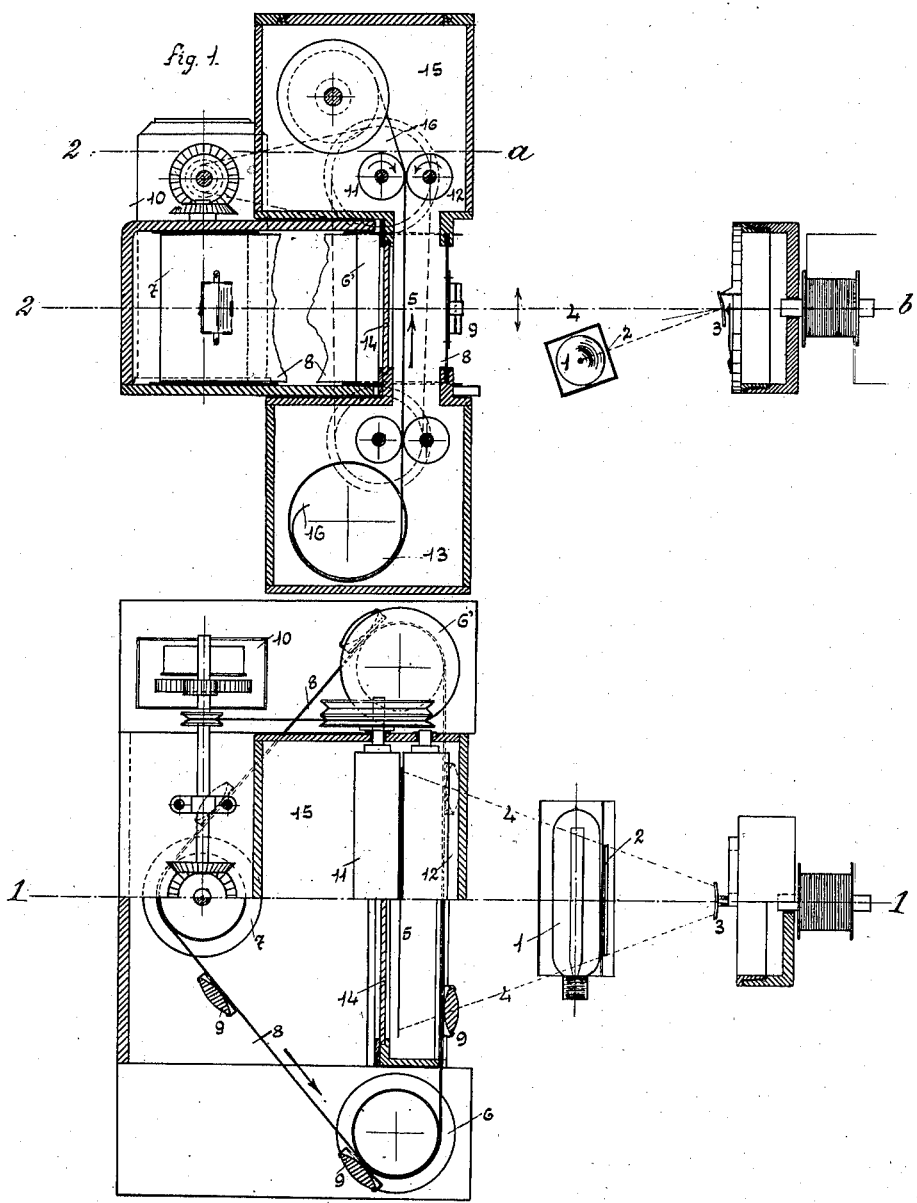

No. 655,677. Patented Aug. 7, 1900.
A. POLLAK & J. VIRAG.
PHOTOGRAPHIC RECORDING APPARATUS FOR VIBRATORY RAYS OF LIGHT.
(Application filed Dec. 14, 1899.)
(No Model.)

WITNESSES:
Fred Whity
René Bruine

INVENTORS:
Anton Pollak and Josef Virag,
By Attorneys,

UNITED STATES PATENT OFFICE.

ANTON POLLAK AND JOSEF VIRAG, OF BUDA-PESTH, AUSTRIA-HUNGARY.

PHOTOGRAPHIC RECORDING APPARATUS FOR VIBRATORY RAYS OF LIGHT.

SPECIFICATION forming part of Letters Patent No. 655,677, dated August 7, 1900.

Application filed December 14, 1899. Serial No. 740,234. (No model.)

*To all whom it may concern:*

Be it known that we, ANTON POLLAK and JOSEF VIRAG, subjects of the Emperor of Austria-Hungary, residing at Buda-Pesth, in the Empire of Austria-Hungary, have invented certain new and useful Improvements in Photographic Recording Apparatus for Vibratory Rays of Light, of which the following is a specification.
This invention relates to a photographic registering apparatus for recording vibratory movements upon a sensitized strip or sheet, so that the vibratory curves are recorded in parallel rows at right angles to the direction of the movement of the strip or sheet.

Our invention may be used as a recording device for any suitable apparatus for varying a ray of light—such, for instance, as mirror-galvanometers—but is especially applicable for use in connection with the apparatus for rapid telegraphic transmission set forth in our application filed May 9, 1899, Serial No. 716,080.

In the annexed drawings, Figure 1 shows the apparatus partly in side view and partly in section on the line 1 1 of Fig. 2. Fig. 2 shows in its upper part a section on the line $2^a$, and in its lower part a section on the line $2^b$, of Fig. 1.
1 is a source of light of any suitable nature, from which is projected a beam or bundle of light-rays through the narrow elongated slit 2 upon a concave mirror 3. This concave mirror 3 is connected to any moving body, the vibrations of which are to be recorded in such manner that, owing to this connection, the mirror performs vibratory movements upon an axis parallel to the slit 2 above referred to. In the application illustrated in the drawings, the mirror is, for instance, shown connected to the diaphragm of a telephone. The vibratory movements of the concave mirror impart vibratory motions to the reflected ray of light 4, which causes a vibrating image of the slit 2 to be formed at a focal plane 5, where it is recorded by the device hereinafter described.

An endless moving band or ribbon 8 is passed around the rollers 6, 6', and 7. This ribbon 8 is provided at equal distances from each other with holes, and over each hole a cylinder-lens 9 is fastened to the ribbon in such manner that the geometric axes of these lenses 9 form right angles with the direction of movement of the ribbon. Rotary motion is imparted to the roller 7 by a suitable motor—for instance, a clockwork 10—which causes the ribbon 8 to travel in the direction shown by the arrow. On their way between the rollers 6 and 6' each of the lenses will allow part of the reflected bundle of rays of light to be passed through such lens. The focal distance of the cylinder-lenses 9 is so adjusted that such part of the ray of light 4 as is caught by a lens is concentrated at the plane 5 to an intense focus. An elongated sheet or strip c of sensitized paper is fed slowly forward in the direction of the arrow by the rollers 11 and 12 and moves in the plane 5, so that the above-mentioned concentrated point of light is formed upon its sensitized coating.

It is obvious that the sensitized paper must be protected against any other light in a light-proof box 15 and after the exposure should be collected in a light-proof receptacle—as, for example, like a film "cartridge."

In the rear of the sheet of sensitized paper a red observation-glass 14 may be provided in the box 15, so that the vibrations of the point of light during the exposure may be observed.

The distance between the individual lenses 9 upon the endless ribbon 8 corresponds exactly to or is slightly smaller than the width of the sheet of sensitized paper 16.

The operation of the apparatus is as follows: In order to record the vibrating rays of light 4, the motor driving the endless ribbon 8 and the sensitized sheet 16 in the direction shown is started. The above-described optical mechanism forms upon the sensitized paper a very sharp point of light, which, owing to the vibrations of the mirror 3, vibrates in a vertical direction and also performs a continuous horizontal motion, owing to the movement of the cylinder-lenses 9. As soon as one of the lenses 9 has passed beyond the sensitized sheet 16, or slightly before, the next following lens becomes operative and again causes the vibrating point of light to travel transversely across the sheet of paper 16; but meanwhile this sheet of sensitized paper 16 has also traveled a certain distance in a direction at right angles to that of the direction of movement of the endless ribbon 8, so that the following vibratory curve is recorded upon the sensitized sheet at a distance corresponding to the travel of the sheet. The record is thus made in successive lines, which, like the lines in a printed book, are read from left to right.

The developing and fixing of the exposed sensitized sheet may be effected in any known manner.

What we claim is—

1. The combination with means for varying a beam of light, a sensitive sheet, and means for advancing the sheet, of means traveling transversely to the sheet for directing said beam across the sheet in successive lines.

2. The combination with means for varying a beam of light, a sensitive sheet, and means for advancing the sheet, of a lens for directing said beam across the sheet in successive lines.

3. The combination with means for varying a beam of light, a sensitive sheet, and means for advancing the sheet, of a plurality of lenses for directing said beam across said sheet in successive lines, said lenses spaced apart a distance corresponding to the desired length of the lines.

4. The combination with means for varying a beam of light, a sensitive sheet, and means for advancing the sheet, an opaque traveling ribbon moving across said sheet, and having openings at intervals, and means adapted to direct light through said openings.

5. The combination with means for moving a broad beam of light, a sensitive sheet, and means for advancing the sheet, of means for directing said light across said sheet in successive lines, comprising a traveling ribbon having openings, spaced apart a distance corresponding to the desired length of the lines, and moving across said sheet, and lenses carried by said ribbon at said openings, adapted to successively direct a part of said beam across the strip.

6. The combination with means for moving a broad and thin beam of light, a sensitive sheet, and means for advancing the sheet, of means for directing said light across the sheet in successive lines, comprising an endless opaque ribbon continuously moving across said sheet at greater speed than the travel of the sheet, said ribbon having openings spaced apart a distance corresponding to the desired length of the lines, and a cylinder-lens carried by the ribbon at each opening.

In witness whereof we have hereunto signed our names in the presence of the subscribing witnesses.

ANTON POLLAK.
JOSEF VIRAG.

Witnesses as to Anton Pollak:
ADOLPH D. WEINER,
F. A. HUBBARD.

Witnesses as to Josef Virag:
EUGENE V. MYERS,
AGNES I. DUNN.